(12) United States Patent
Malyshev et al.

(10) Patent No.: US 8,635,694 B2
(45) Date of Patent: Jan. 21, 2014

(54) SYSTEMS AND METHODS FOR MALWARE CLASSIFICATION

(75) Inventors: Alexey Malyshev, Moscow (RU); Timur Biyachuev, Moscow (RU); Dmitry Ilin, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 495 days.

(21) Appl. No.: 12/631,001

(22) Filed: Dec. 4, 2009

(65) Prior Publication Data

US 2010/0180344 A1 Jul. 15, 2010

(30) Foreign Application Priority Data

Jan. 10, 2009 (RU) .................................. 2009136235

(51) Int. Cl.
*G06F 21/00* (2013.01)
(52) U.S. Cl.
USPC .......................................... 726/23; 713/188
(58) Field of Classification Search
USPC ........................................................... 726/24
See application file for complete search history.

(56) References Cited

U.S. PATENT DOCUMENTS

| | | | |
|---|---|---|---|
| 5,640,537 A | 6/1997 | Jessen et al. | |
| 5,787,416 A | 7/1998 | Tabb et al. | |
| 5,790,778 A | 8/1998 | Bush et al. | |
| 6,317,788 B1 | 11/2001 | Richardson | |
| 6,424,971 B1 | 7/2002 | Kreulen et al. | |
| 6,449,739 B1 | 9/2002 | Landan | |
| 6,775,780 B1 * | 8/2004 | Muttik | 726/24 |
| 6,973,577 B1 * | 12/2005 | Kouznetsov | 726/25 |
| 7,243,374 B2 | 7/2007 | Howard et al. | |
| 7,356,736 B2 | 4/2008 | Natvig | |
| 7,434,261 B2 | 10/2008 | Costea et al. | |
| 7,532,214 B2 | 5/2009 | Lundstrom | |
| 7,832,011 B2 * | 11/2010 | Obrecht et al. | 726/24 |
| 2003/0135791 A1 | 7/2003 | Natvig | |
| 2004/0073810 A1 * | 4/2004 | Dettinger et al. | 713/201 |
| 2004/0088577 A1 | 5/2004 | Render | |
| 2005/0010548 A1 | 1/2005 | Kobayashi | |
| 2005/0066165 A1 | 3/2005 | Peled et al. | |
| 2005/0102667 A1 | 5/2005 | Barta et al. | |
| 2006/0156292 A1 | 7/2006 | Nagashima et al. | |

(Continued)

FOREIGN PATENT DOCUMENTS

| | | |
|---|---|---|
| EP | 1026887 | 8/2000 |
| EP | 1912126 | 4/2008 |

(Continued)

*Primary Examiner* — Gilberto Barron, Jr.
*Assistant Examiner* — Devin Almeida
(74) *Attorney, Agent, or Firm* — Arent Fox LLP; Michael Fainberg (57) ABSTRACT

Disclosed are systems, methods and computer program products for detection, classification and reporting of malicious software. A method comprises loading software code into a computer system memory and emulating the software code. The software code and its activity log are then analyzed for presence of a malware. If a malware is detected, an execution flow graph is created from the activity log. The execution flow graph is then parsed using heuristic analysis to identify one or more malicious behavior patterns therein. Then, similarity indexes between the identified malicious behavior patterns and one or more malicious behavior patterns associated with known classes of malware are computed. The emulated software code is then classified into one or more classes of malware based on the computed similarity indexes. Finally, a comprehensive malware report of the emulated software code is generated based on the execution flow graph and malware classification information.

33 Claims, 9 Drawing Sheets

(56) References Cited

U.S. PATENT DOCUMENTS

| | | |
|---|---|---|
| 2007/0094736 A1* | 4/2007 | Kitahara et al. ................ 726/26 |
| 2007/0169194 A1 | 7/2007 | Church et al. |
| 2007/0180522 A1 | 8/2007 | Bagnall |
| 2007/0186282 A1 | 8/2007 | Jenkins |
| 2007/0283192 A1 | 12/2007 | Shevchenko |
| 2008/0195587 A1 | 8/2008 | Hussami |
| 2008/0201129 A1 | 8/2008 | Natvig |
| 2009/0070101 A1 | 3/2009 | Masuyama et al. |

FOREIGN PATENT DOCUMENTS

| | | |
|---|---|---|
| JP | 2006031331 | 2/2006 |
| WO | WO9857260 | 12/1998 |
| WO | WO0165388 | 7/2001 |
| WO | WO02073521 | 9/2002 |
| WO | WO03077071 | 9/2003 |
| WO | WO2004102418 | 11/2004 |
| WO | WO2006020260 | 2/2006 |
| WO | WO2006076638 | 7/2006 |
| WO | WO2006123013 | 11/2006 |

* cited by examiner

| ID | API Name |
|---|---|
| 1 | GetModuleHandleA |
| 2 | GetProcessAddress |
| 3 | GetModuleFileNameA |
| 4 | LoadLibraryA |
| ... | ... |
| 198 | FindClose |
| 199 | InternetOpenUrlA |
| 200 | SelectObject |
| 201 | TranslateMessage |
| ... | ... |

FIG. 7

| Function | ID |
|---|---|
| CreateFileA() | 10 |
| WriteFile() | 25 |
| CloseHandle() | 6 |
| WinExec() | 126 |

FIG. 8

| Par_Table |
|---|
| c:\windows\explorer.exe |
| xp |
| 2003 |
| explorer.exe |

SYSTEMS AND METHODS FOR MALWARE CLASSIFICATION

CROSS-REFERENCE TO RELATED APPLICATIONS

This application claims benefit of priority under 35 U.S.C. 119(a) to a Russian patent application no. 2009136235 filed on Oct. 1, 2009, which is incorporated by reference herein.

TECHNICAL FIELD

The present disclosure relates generally to the field of computer science and, in particular, to systems and methods for detection, classification and reporting of malware.

BACKGROUND

The growing sophistication and rapid proliferation of malicious software, also known as malware, presents an ever-increasing security threat to personal and enterprise computer systems worldwide. New types of malware emerge daily and spread rapidly through the Internet and local area networks, e-mail, Instant Messaging and file sharing services and other data communication technologies. Known malicious software can be automatically detected by anti-malware programs and classified into one of several categories, such as viruses, worms, Trojan horses and spyware, based on the software code or behavior pattern. However, there are many other types of malware with hidden code and constantly changing behavior, such as polymorphic viruses and obfuscated malware, which make automatic detection and classification difficult. As a result, the anti-malware programs may fail to automatically detect and classify these types of malware or spend such a significant amount of time and system resources on the analysis of these programs that the detection process becomes inefficient. Accordingly, there is need for new and more effective methods for automatic detection and classification of malicious software.

SUMMARY

Disclosed herein are systems, methods and computer program products for detection, classification and reporting of malicious software. One example embodiment of such a method comprises loading software code into a computer system memory and emulating the software code. In one aspect, the software code may be emulated in a software emulator or a script emulator, which provide a secure virtual runtime environment for execution of the software code. In another aspect, the software code may be emulated in a sandbox, which provides a dedicated secure runtime environment that may be specifically customized per user requirements to resemble user's native computing system. An encrypted software code may be first decrypted and then emulated. During software emulation, actions of the software code, such as application program interface (API) calls and parameters of the API calls as well as information about files created and modified by the emulated software code are recorded in an actively log.

In one aspect, the software code and its activity log are then analyzed for presence of a malware using signature matching and/or security rating algorithms. If a malware is detected, an execution flow graph of the emulated software code may be created from the activity log. The execution flow graph is then parsed using heuristic analysis to identify one or more malicious behavior patterns therein. Then, similarity indexes between the identified malicious behavior patterns and one or more malicious behavior patterns associated with known classes of malware are computed. The emulated software code is then classified into one or more classes of malware based on the computed similarity indexes for the one or more malicious behavior patterns. Finally, a comprehensive malware report of the emulated software code may be generated based on the execution flow graph and malware classification information.

In one example embodiment, the malware report may be used along with user localization data to generate customized malware reports for the emulated software code. The customized report may be in a human readable form, such as an HTML format. Depends on the user requirements, the customized reports may be in different languages and have different degrees of specificity and information about the emulated software code. For example, malware reports prepared for programmers and malware specialists may include detailed information about malicious actions, such as API calls and their parameters as well as files modified/created by the emulated software code. Malware reports for unsophisticated computer users may include malware classification information and general information about behavior and harm that the emulated software code causes to a computer system. Furthermore, customized malware reports may include graphic cluster diagrams of malware classifications associated with the emulated software code, which visualize the relationships between the emulated software code and other malicious programs associated with the same or related classes of malware.

The above simplified summary of one or more example embodiments of the invention serves to provide a basic understanding of such embodiments. This summary is not an extensive overview of all contemplated aspects of the invention, and is intended to neither identify key or critical elements of all embodiments nor delineate the scope of any or all embodiments. Its sole purpose is to present some concepts of one or more aspects in a simplified form as a prelude to the more detailed description that follows. To the accomplishment of the foregoing and related ends, the one or more aspects comprise the features hereinafter fully described and particularly pointed out in the claims. The following description and the annexed drawings set forth in detail certain illustrative features of the one or more embodiments. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example embodiments of the invention and, together with the detailed description serve to explain the principles and implementations of the embodiments.

In the drawings.

DESCRIPTION OF EXAMPLE EMBODIMENTS

Example embodiments are described herein in the context of systems, methods and computer program products for automatic detection, classification and reporting of computer malware. Those of ordinary skill in the art will realize that the following description is illustrative only and is not intended to be in any way limiting. Other embodiments will readily suggest themselves to such skilled persons having the benefit of this disclosure. Reference will now be made in detail to implementations of the example embodiments as illustrated in the accompanying drawings. The same reference indicators will be used to the extent possible throughout the drawings and the following description to refer to the same or like items.

Figure 1:
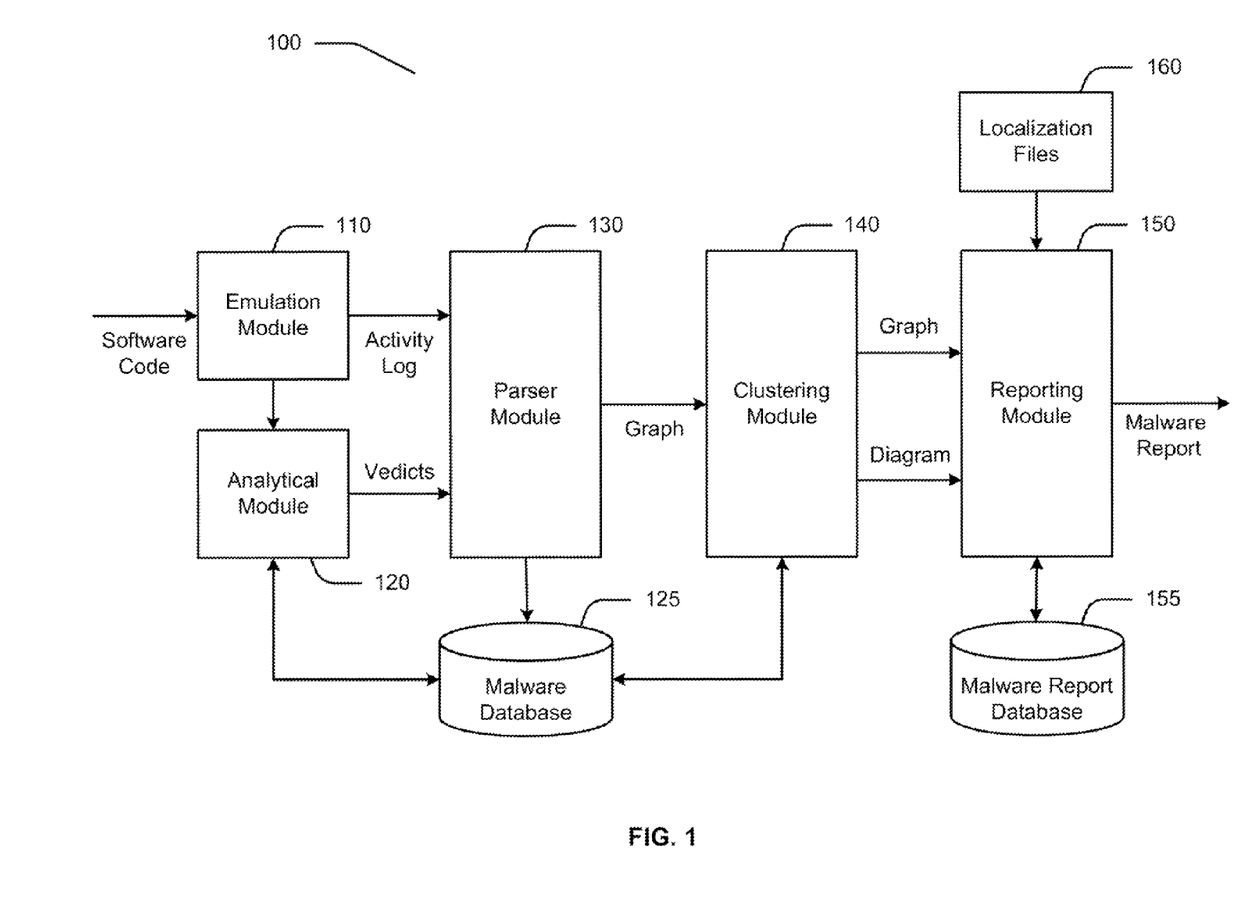
FIG. 1 illustrates a schematic block diagram of an anti-malware application in accordance with one example embodiment.

FIG. 1 illustrates schematic block diagrams of an anti-malware application 100 for automatic detection, classification and reporting of computer malware in accordance with one example embodiment of the invention. The anti-malware application 100 may be loaded and executed on a network server, a personal computer, a mobile device or other computing device that requires anti-malware protection. The anti-malware application 100 may include the following software components: emulation module 110, analytical module 120, parser module 130, clustering module 140 and reporting module 150. The anti-malware application 100 may also include or be remotely connected to a malware database 125 and a malware report database 155. The anti-malware application 100 may also have access to localization files 160. Other software components and databases may be used in various embodiments of the invention.

Figure 2:
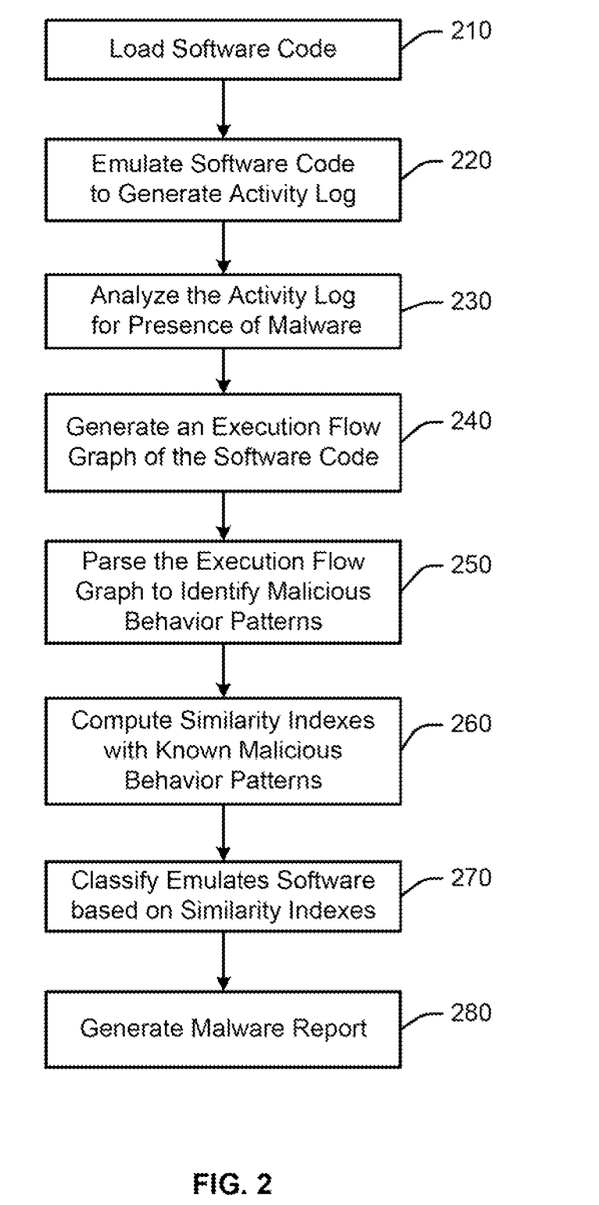
FIG. 2 illustrates a flow diagram of a method for malware detection, classification and reporting in accordance with one example embodiment.

FIG. 2 illustrates one example embodiment of a method of operation of the anti-malware application 100. At step 210, a software code is loaded on a computer system for processing by the anti-malware application 100. At step 220, the emulation module 110 emulates the loaded software code and records actions of the software code in an activity log. At step 230, the analytical module 120 analyzes the software code and the activity log for the presence of a malware. At step 240, the parser module 130 generates from the activity log an execution flow graph of the emulated software code and, at step 250, parses the execution flow graph to identify one or more malicious behavior patterns therein. At step 260, the clustering module 140 computes similarity indexes between the identified malicious behavior patterns and one or more malicious behavior patterns associated with known classes of malware and, at step 270, classifies the emulated software code into one or more classes of malware based on the computed similarity indexes for the one or more malicious behavior patterns. At step 280, the reporting module 150 generates a malware report from the execution flow graph and malware classification information. More specific description of the configuration and operation of the individual components of the anti-malware application 100 will be provided next.

Figure 3:
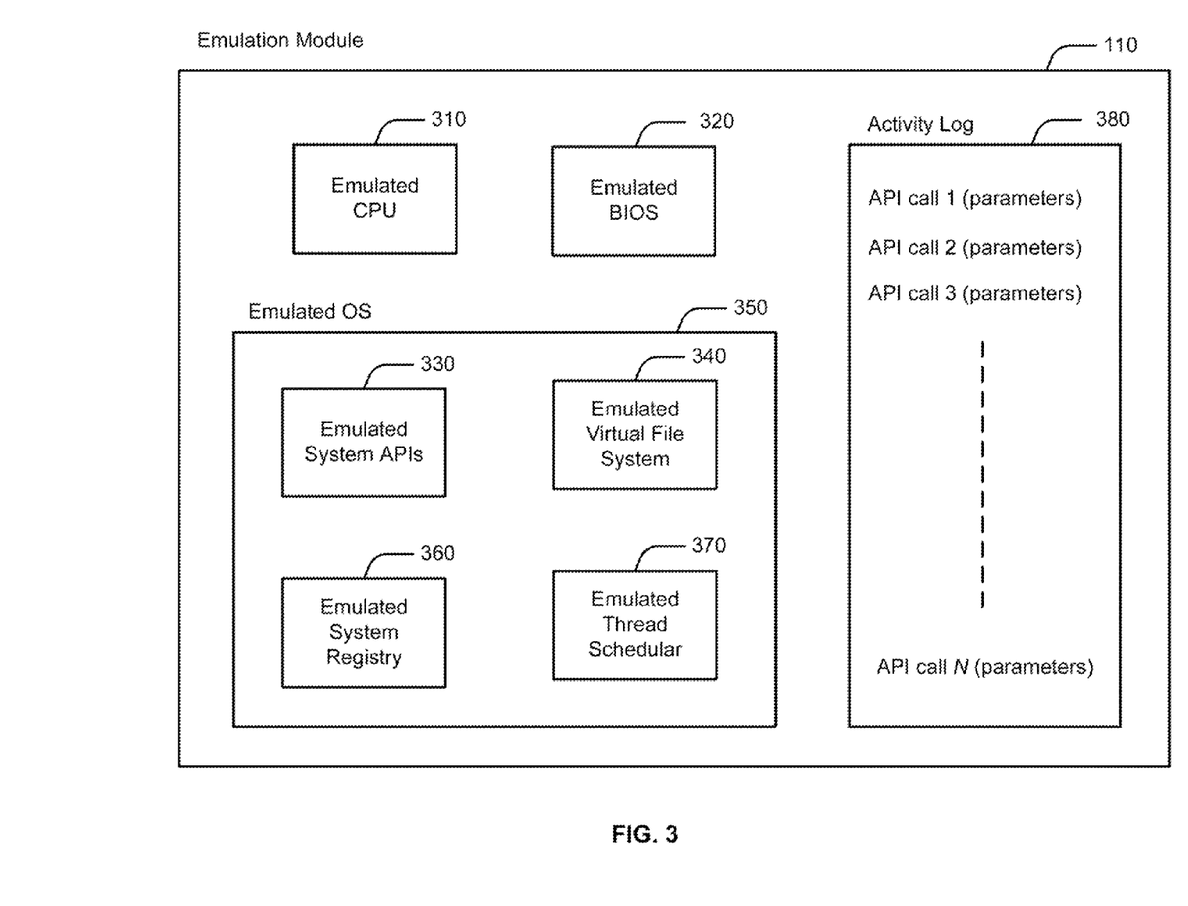
FIG. 3 illustrates a schematic block diagram of an emulation module of the anti-malware application in accordance with one example embodiment.

FIG. 3 depicts one example embodiment of the emulation module 110 that provides a secure virtual runtime environment for execution of a software code by the anti-malware application 100 in a random access memory of any computer system. The virtual runtime environment provided by the emulation module 110 may include an emulated central processing unit (CPU) 310, such as Intel® Dual Core® processor or the like, an emulated basic input/output system (BIOS) 320, and an emulated operating system (OS) 350, which may include emulated system APIs 330, such as Win32 APIs and the like, an emulated virtual file system 340, an emulated system registry 360 and an emulated thread scheduler 370. The emulation module 110 may also includes an activity log 380 for recording actions of the emulated software code, such as API calls and associated parameters as well as files created/modified by the emulated software code. The emulation module 110 may include other emulated hardware and software components known to those of ordinary skill in the art, such as user input devices and the like.

In one aspect, the emulation module 110 is operable to emulate executable files (.exe), dynamic link libraries (.dll) and other types of files. In another aspect, the emulation module 100 is also operable to emulate software code written in various programming languages, such as low level assembly code or high level C, C++, Perl, Java, Visual Basic, XML, HTML and other known programming languages. Yet in another aspect, the emulation module 110 may also emulate software scripts, such as Java Scripts, Visual Basic Scripts and other scripts executable by Web browsers. In another aspect, the emulation module 110 may also emulate encrypted software codes or scripts by decrypting them using known decryption techniques. Yet in another aspect, the emulation module 110 may also emulate compressed software codes by decrypting them using known decompression techniques. The emulation module 110 may have other functions known to those of ordinary skill in the art in various other embodiments.

In another embodiment, the emulation module 110 may also provide customizable sandboxes that provide dedicated secure runtime environments that may be specifically customized per user's malware-detection requirements. For example, a user wants to detect a specific Trojan-banker malware with following behavior: The malware sits in a memory of a user computer system and waits for the user to navigate his Web browser application to a bank's website. The malware then generates a simulate login screen, which covers the bank's real login screen. The malware intercepts user authentication data, such as user name and password, and sends it to some e-mail address. To address this problem, a custom sandbox may be configured in the emulation module 110 to imitate bank's website and the algorithm of user authentication actions on this site. Various software codes may then be loaded and emulated in the sandbox to detect and classify those software codes that perform actions of the Trojan-banker malware.

Figure 4:
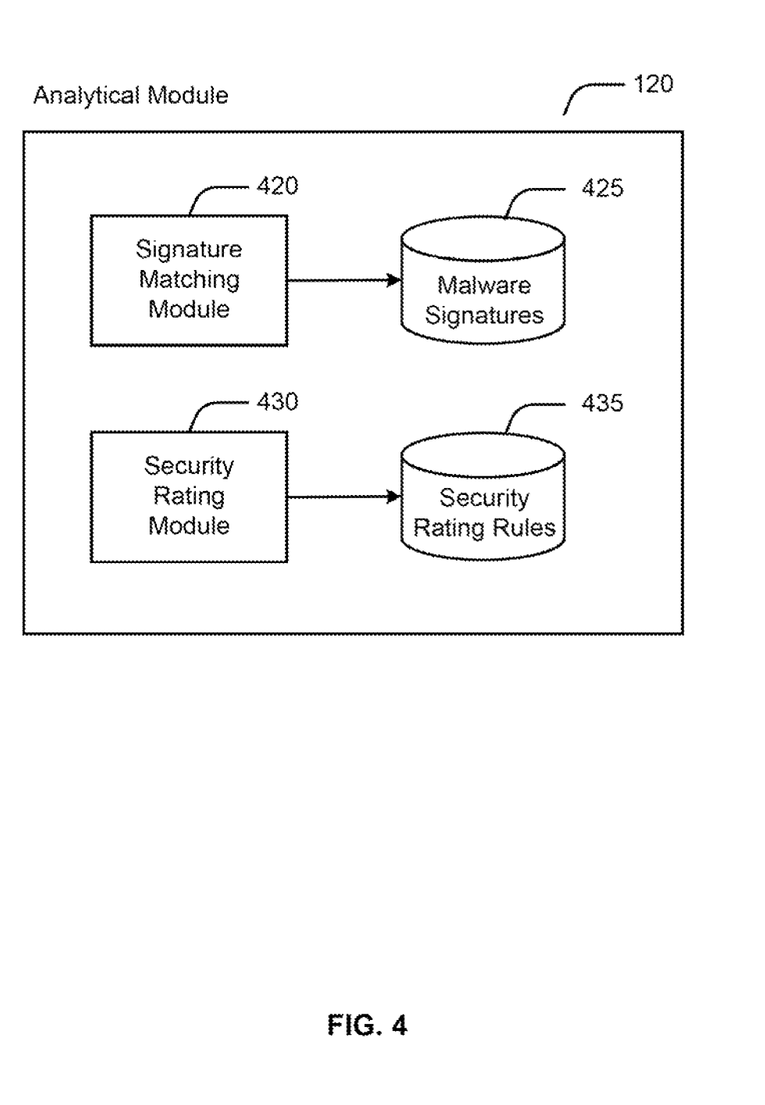
FIG. 4 illustrates a schematic block diagram of an analytical module of the anti-malware application in accordance with one example embodiment.

FIG. 4 depicts one example embodiment of the analytical module 120 that analyzes the software code and its activity log for the presence of a malware. In one aspect, the analytical module 120 includes a signature matching module 420 that scans the software code and compares it with a dictionary of know viral codes, also known as signatures, stored in a database 425. Certain malware signatures are only attributed to certain classes of malware. Therefore, a quick scan through the software code can identify whether it contains any viral codes and if so what class of malware do these codes associate with. If results of the of the signature matching analysis indicate that the software code includes certain viral codes, the analytical component 120 may pass the activity log of the emulated software code and the information about identified viral codes to the parsing module 130 for further analysis. If no viral codes have been identified by the signature matching module 420, the analytical module 120 may perform security rating analysis of the activity log of the emulated software code in the security rating module 430.

In one example embodiment, the security rating module 430 performs risk analysis of the emulated software code based on the security ratings, as disclosed in a commonly owned U.S. Pat. No. 7,530,106 entitled "System and Method for Security Rating of Computer Processes," which is incorporated by reference herein in its entirety. In general, the security rating R may vary from 'safe' to 'dangerous' (high) and calculated from 0 to 100 percent. 0 is the safest level and 100% is the most dangerous level. As an example, computer process is rated as 'safe' with a rating of 0-25%, a process rated as 'moderately dangerous' or 'suspicious' with a rating of 25-75% and in excess of 75% the process is rated as 'dangerous' (high). The security rating R is the number that could be divided in two parts: part one is static rating and part two is dynamic rating. Before the software code is emulated, the certain criteria of the file are analyzed, such name of the file, file size, file's location, compression, whether the file is packed, and whether the file was received from a CD-ROM, etc. These criteria determine the static rating S of the file. After that the emulation of the software code is launched, each action of the emulated software code may be compared to the list of factors, a list of weights and various other security rating rules stored in the database 435 and to each emulated event and process, so that an individual rating of safety or danger may be assigned. The final rating is a sum of rating of all events and processes. This generates a dynamic rating D. Based on the final rating value R, the security rating module 430 may decide if the emulated software code is malicious and if further analysis of the code is necessary with the parser module 130.

Figure 5:
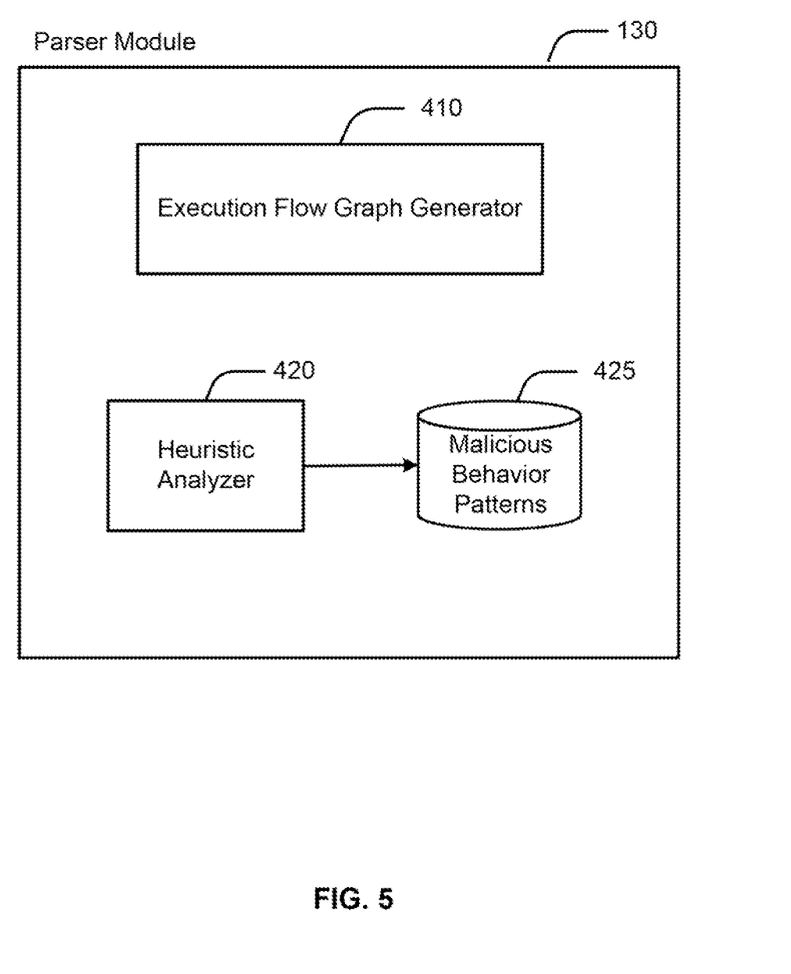
FIG. 5 illustrates a schematic block diagram of a parser module of the anti-malware application in accordance with one example embodiment.

FIG. 5 depicts one example embodiment of the parser module 130 that performs comprehensive analysis of the emulate software code in the event that a malicious code or malicious activity was detected in the analytical module 120. The parser module 130 may include an execution flow graph generator 410, a heuristic analyzer 420 and a database of malicious behavior patterns 425. In one aspect, the execution flow graph generator 410 constructs an execution flow graph of the emulated software code from the activity log provided by the emulation component 110. The graph illustrates the execution flow of the emulated software code in a simplified graphic form, which facilitates analysis of the graph for known malicious behavior patters by the heuristic analyzer 420 and by human malware experts.

To generate an execution flow graph, the parser module 130 first parses the activity log, removes all duplicated API calls and unimportant parameters of the API calls, adds identifiers to the API calls and its parameters, flags viral codes identified by the signature matching module 420 and actions having high security ratings, and performs other preprocessing operations on the activity log of the emulated software code. The parser module 130 then generates an execution flow graph from the pre-processed activity log.

Figure 6:
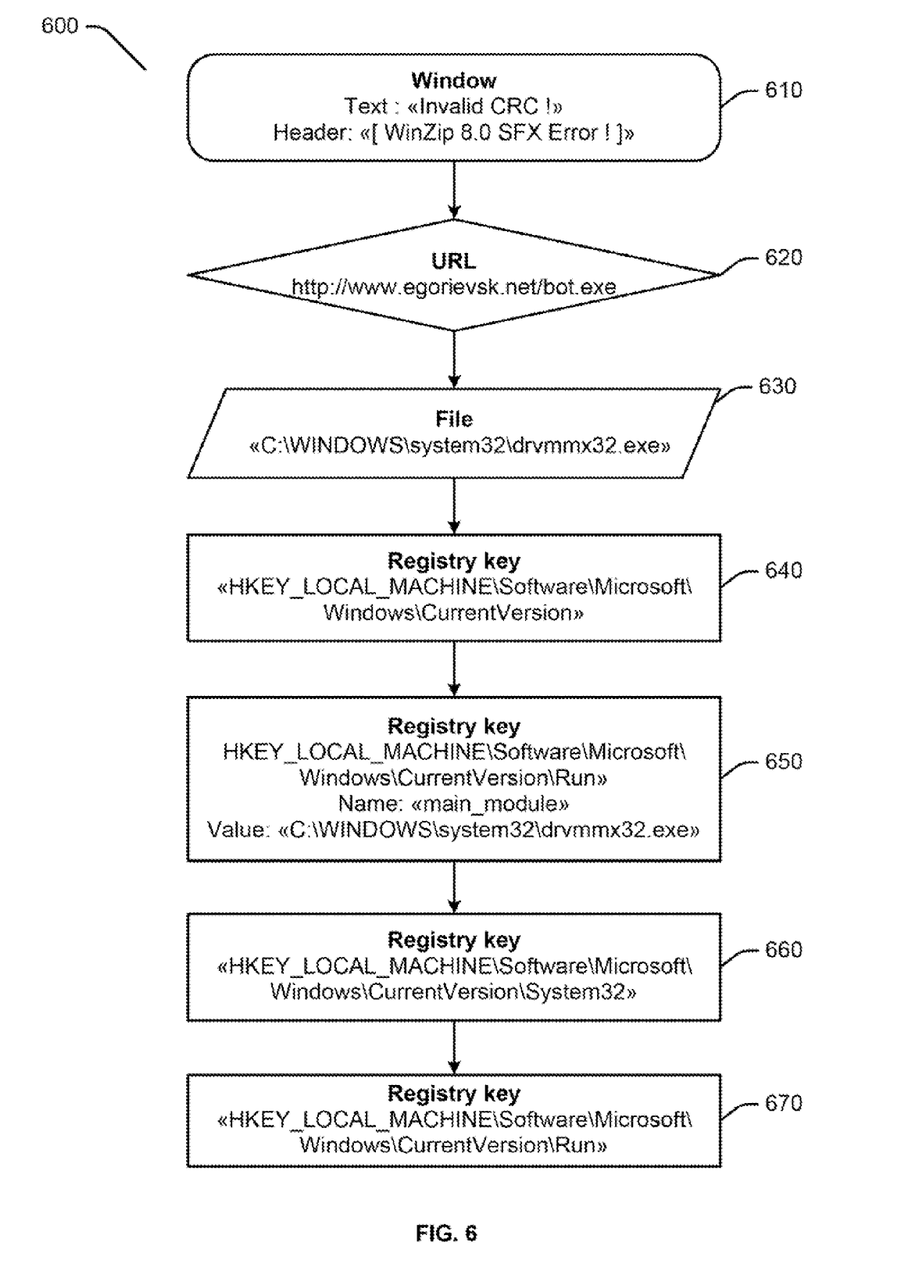
FIG. 6 illustrates one example embodiment of the execution flow graph.

FIG. 6 depicts one example of an execution flow graph 600 created by the parser module 130 from the following activity log of a malicious software:
1) Creating a window <<Invalid CRC !>> having heading <<[WinZip 8.0 SFX Error!]>>
2) Creating a file <<C:\WINDOWS\system32\drvmmx 32.exe>>.
3) Downloading file bot.exe from URL <<http://www.egorievsk.net/bot.exe>>.
4) Writing downloaded file into file <<C:\WINDOWS\ system32\drvmmx32.exe>>.
5) Opening registry key <<HKEY_LOCAL_MACHINE\ Software\Microsoft\Windows\CurrentVersion>>.
6) Removing registry key <<HKEY_LOCAL_ MACHINE\Software\Microsoft\Windows\CurrentVersion\ System32>>.
7) Opening registry key <<HKEY_LOCAL_MACHINE\ Software\Microsoft\Windows\CurrentVersion\Run>>.
8) Creating value << main_module>> in the registry key <<HKEY_LOCAL_MACHINE\Software\Microsoft\ Windows\CurrentVersion\Run>> and assign this value to the line <<C:\WINDOWS\system32\drvmmx32.exe>>.

In one aspect, different actions performed by the malicious software code may be designated using blocks of different shapes. For example, in graph 600, opening of a new window may be designated by an oval, block 610; accessing of a URL and downloading of a file may be designated by a rhombus, block 620; storing of the downloaded file may be designated by a parallelogram, block 630; changes to the system registry may be designated by rectangles, blocks 640-670. Other types of actions may be designated by differently shapes. Furthermore, parser module 130 may omit or combine one or more actions in the activity log into a single block. For example, in graph 600, creating a file drvmmx32.exe and writing downloaded file bot.exe into the newly created drvmmx32.exe file were designated by a single parallelogram 630.

In another aspect, the parser module 130 further includes a heuristic analyzer 420 that performs heuristic analysis of the execution flow graph to identify within the graph malicious behavior patterns (subgraphs) associated with known classes of malware. In particular, the heuristic analyzer 420 compares the one or more API calls identified in the execution flow graph with the known malicious behavior patterns for various classes of malware, which are stored in database 425. In one aspect, the database 425 also contains information about windows, files processes, registry keys, and other objects used by various classes of malware. Based on this comparison, the heuristic analyzer 420 identifies and marks in the execution flow graph those API calls that resemble malicious behavior patterns in the database 425. The heuristic analyzer 420 also identifies in the execution flow graph which classes of malware are associated with malicious behavior patterns found in the execution flow graph of the emulated software code. Thus, the heuristic analyzer 420 may detect several different malicious behavior patterns (subgraphs) in the execution flow graph and identify each of these patterns accordingly. For example, in the execution flow graph 600, block 650 (recording of the downloaded file into the registry) and block 670 (assignment to the file auto run option) are identified as common malware actions associated with Trojan-Downloader and Backdoor classes of malware.

In one aspect, the heuristic analyzer 420 may use results of the analytical module 120 to expedite the heuristic analysis of the execution flow graph for known malicious behavior patterns. For example, if the signature matching module 420 identified within the software code one or more signatures associated with known classes of malware, such as Trojan horse or spyware, the heuristic analyzer 420 may limit its search for malicious behavior patterns in the execution flow graph to the patterns associated with the classes of malware identified by the signature matching module. In this manner, heuristic analyzer 420 does not need to compare actions (e.g., API calls and associated parameters) identified in the execution flow graph of the emulated software code against all patterns stored in the database 425 but only against patterns associated with the classes of malware identified by the signature matching module. Similarly, the security rating results may be used by the heuristic analyzer 420 to further limit search for malicious behavior patterns within the execution flow graph and database 425.

Based on the results of the heuristic analysis of the execution flow graph of the emulated software code by the parser module 130, the execution flow graph may be filled with information about behavior of classes of malware associated with the malicious behavior patterns identified in the graph, such as Trojan aspects of conduct (e.g. changing the hosts file); accompanying malicious actions (e.g., disabling of sound, which is often performed by malicious software to silence alerts of the anti-malware program on the user computer); and other actions that were not interpret by the heuristic analyzer 420 (e.g., removal of non-existent registry keys). In another aspect, information about created/modified files, accessed URL addresses, accessed/modified/deleted registry keys, names of the opened windows, names of the opened processes may be added to the respective blocks in the execution flow graph. In addition, security ratings and malware signature matching information may be added to the execution flow graph. Yet in another aspect, blocks associated with malicious behavior patterns may be designated by different colors to make it easier for the malware experts to identify malicious behavior patterns within the graph. Other types of malware-related information and designations may be used in the execution flow graph in accordance with other aspects of the invention.

In one example embodiment, the anti-malware software 100 may also include the clustering module 140 that quantitatively classifies the emulated software code into one or more classes of malware. Such malware classes may include, but are not limited to, viruses, worms, Trojan horses, spyware and various other classes and subclasses of malware known to those of ordinary skill in the art. In particular, the clustering module 140 is operable to compute similarity indexes between the malicious behavior patterns identified in the execution flow graph of the emulated software code and one or more malicious behavior patterns associated with known classes of malware, such as malicious behavior patterns stored in the database 125 (or database 425). The clustering module 140 then quantitatively classifies the emulated software code into one or more classes of malware based on the computed similarity indexes.

Figure 7:
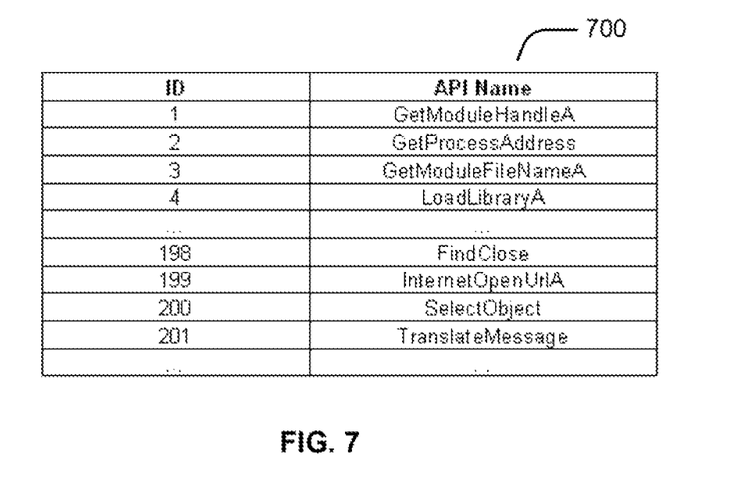
FIG. 7 illustrates one example embodiment of a reference API table.
Figure 8:
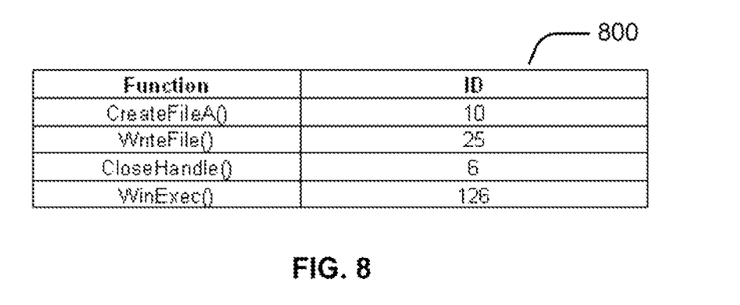
FIG. 8 illustrates one example embodiment of an API function table of a malware.
Figure 9:
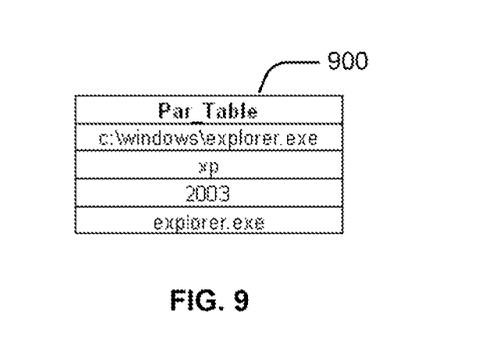
FIG. 9 illustrates one example embodiment of an API parameter table of a malware.

More specifically, to perform quantitative malware classification, the clustering module 140 may use a reference table 700 depicted in FIG. 7 that contains a list of standard API functions 700 (API Name field) ordered by unique identifiers (ID field). For example, standard API function GetModuleHandleA (ID=1) gets value of the descriptor for the software code, and InternetOpenUrlA (ID=199) opens a file from this source. The clustering module 140 then generates an API function table for each malicious behavior pattern identified in the execution flow diagram of the emulated software code. An example of such an API function table for malicious software code is depicted in FIG. 8. Based on the API function table, the clustering module 140 may compute a FuncString (identification string) as follows: FuncString=<<6;10;25; 126>>. The clustering module 140 also computes a ParTable (parameter table), which stores parameters of the API calls performed by the emulated software code. FIG. 9 depicts a ParTable for the following software code:

```
GetModuleFileNameA(«C:\WINDOWS\explorer.exe»)
  _strupr(«C:\WINDOWS\explorer.exe»)
  _mbscat("", "XP")
  _mbscpy("XP")
  strstr("XP", "2003")
  strstr("C:\WINDOWS\EXPLORER.EXE","EXPLORER.EXE").
```

Having constructed the FuncString and ParTable for each malicious behavior pattern, the clustering module 140 may compute function similarity index (IndexFunc) and parameter similarity index (IndexPar) for each malicious behavior pattern identified in the emulated software code.

The IndexFunc for each malicious behavior pattern may be computed as follows: 2*Q 3/(Q1+Q2), where Q1 is a number in the API functions in the malicious behavior pattern of the emulated software code, Q2 is a number of API functions in a similar known malicious behavior pattern in database 125, and Q3 is a number of identical functions between Q1 and Q2. For example, if FuncString1=<<6;10;25;126>>, a FuncString2=<<6;10;25;425>>, then IndexFunc=(2*3)/8=0.75.

The IndexPar for each malicious behavior pattern may be computed as follows: 2*Q3/(Q1+Q2), where Q1 is a number in the API parameters in the malicious behavior pattern of *the* emulated software *code*, Q2 is a number of API parameters in a similar known malicious *behavior* pattern in database 125, and Q3 is a number of identical API parameters between Q1 *and* Q2. F*or example*, emulated software code includes the following API *calls*:
  1) URLDownloadToFileA(<<http://www.abc.com/xicarajpg>>, <<C:\WINDOWS\system32\xicara.exe>>)
  2) WinExec(<<C:\WINDOWS\system32\xicara.exe>>);
And a known malicious behavior pattern includes the following API calls:
  1) URLDownloadToFileA(<<http://www.abc.com/xicarajpg>>, <<C:\WINDOWS\svcpool.exe>>)
  2) WinExec(<<C:\WINDOWS\svcpool.exe>>);
Then ParTables for these two software codes will be as follows:

| ParTable1 | ParTable2 |
|---|---|
| http://www.abc.com/xicara.jpg | http://www.abc.com/xicara.jpg |
| C:\WINDOWS\system32\xicara.exe | C:\WINDOWS\svcpool.exe |

And IndexPar will be computed as follows: (2*1)/4=0.5.

In one example embodiment, either one of these indexes may be used for quantitatively classifying malware. In another aspect, the functions similarity index (IndexFunc) and parameter similarity index (IndexPar) can be combined (e.g., averaged) to generate a common similarity index used for quantitatively classifying malware. For example, an emulated software code can be associated with a class of malware if combined index is greater than 0.95. Those of skill in the art will appreciate that there other formulas and algorithms may be used to quantitatively classify malicious software code into one or more classes of malware.

Figure 10:
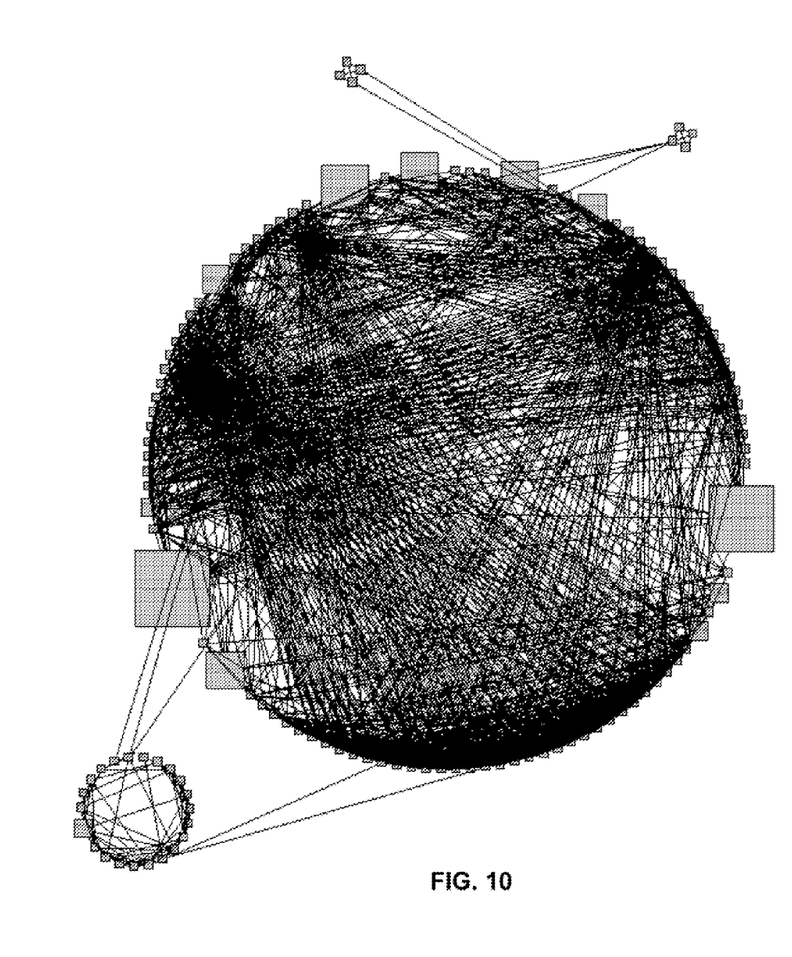
FIG. 10 illustrates one example of embodiment of a cluster diagram for a malware class.

In one example embodiment, the clustering component 140 is operable to generate a graphic cluster diagrams of malware class associated with the emulated software code, which visualize the relationships between the emulated software code and other malicious programs associated with the same or related classes of malware. FIG. 10 depicts one example embodiment of a cluster diagram for a Backdoor.Win32.Agent.*. In the beginning of 2009, this class of malware included 7285 files, having 3957 different FuncStrings. For establishing connections between files in that class, the FuncString for two files had to be more than 0.95. Two small groups in diagram in FIG. 10 include 2 files each and a medium group includes 7 files. The diagram provides convenient in describing relations between large and small classes of files. The diagram can be easily updated as new files are added to the depicted class of malware.

In one example embodiment, the anti-malware application 100 further includes a reporting module 150 that generates various reports based on the execution flow graph and malware classification information provided by the parsing module 130 and clustering module 140, respectively. In one aspect, the reporting module combines all the information contained in the execution flow graph with the classification information to generate a comprehensive malware report in a XML format or other generic format. The generated reports may be stored by the reporting module in a malware report database 155. Upon request from the user, the reporting module 150 may retrieve the comprehensive report and generate customized malware reports in a human readable form, such as an HTML or TEXT formats.

In one aspect, the comprehensive report about various types of malware may include information about behavior of classes of malware associated with the malicious behavior patterns identified in the execution flow graph of the malware. This information may include description of aspects of behavior and accompanying malicious actions performed by the software code. The report may also include information about created/modified files, accessed URL addresses, accessed/modified/deleted registry keys, names of the opened windows, and names of processes executed by the malware. In addition, information about security ratings and malware signature matching data may be included in the report. Other types of malware-related information may be included in the comprehensive or customized reports generated by the reporting module 150.

In one aspect, the reporting module 150 may use localization files 160 to generate customized reports in different languages. In another aspect, the reporting module 150 may generate reports having different degrees of specificity and information about the malware. For example, malware reports prepared for programmers and malware specialists may include detailed information about malicious actions, such as API calls and their parameters as well as files modified/created by the malware. Malware reports for unsophisticated computer users may include malware classification information and general information about behavior and harm that the malware may causes to a computer system. Furthermore, customized malware reports may include graphic cluster diagrams of malware classifications, which visualize the relationships between different malicious codes in the same and related classes of malware.

Figure 11:
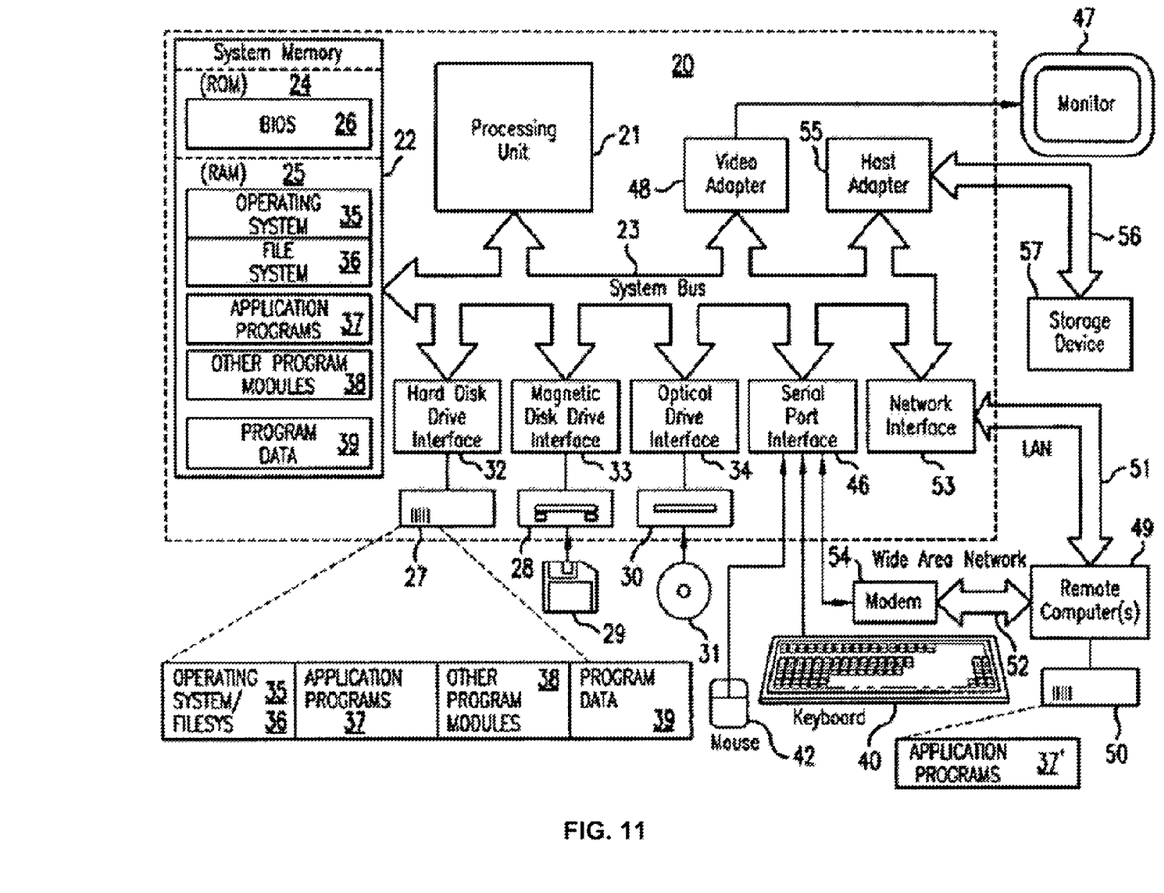
FIG. 11 illustrates a schematic block diagram of a computer system in accordance with one example embodiment.

FIG. 11 depicts an exemplary computer system on which the anti-malware application 100 may be executed. In one aspect, the computer system 20 may be in the form of a personal computer or server or the like, and include a processing unit 21, a system memory 22, and a system bus 23 that couples various system components including the system memory to the processing unit 21. The system bus 23 may be any of several types of bus structures including a memory bus or memory controller, a peripheral bus and a local bus using any of a variety of bus architectures. The system memory includes a read-only memory (ROM) 24 and random access memory (RAM) 25. A basic input/output system 26 (BIOS), containing the basic routines that help to transfer information between the elements within the computer system 20, such as during start-up, is stored in ROM 24.

The computer system 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules/subroutines, where each of the steps described above can be a separate module, or several steps can be aggregated into a single module, and other data for the personal computer 20. Although the exemplary environment described herein employs a hard disk, a removable magnetic disk 29 and a removable optical disk 31, it should be appreciated by those skilled in the art that other types of computer readable media that can store data accessible by a computer, such as magnetic cassettes, flash memory cards, digital video disks, RAMs, ROMs, EPROMs and the like may also be used in the exemplary operating environment.

A number of program modules may be stored on the hard disk, magnetic disk 29, optical disk 31, ROM 24 or RAM 25, including an operating system 35. The computer system 20 includes a file system 36 associated with or included within the operating system 35, one or more application programs 37, such as an anti-malware application 100, other program modules 38 and program data 39. A user may enter commands and information into the personal computer 20 through input devices such as a keyboard 40 and pointing device 42. Other input devices may include a microphone, joystick, touch pad/display, scanner or the like. These and other input devices are often connected to the processing unit 21 through a serial port interface 46 coupled to the system bus, and can be connected by other interfaces, such as a parallel port, game port or universal serial bus (USB). A monitor 47 or some other type of display device is also connected to the system bus 23 via an interface, such as a video adapter 48. In addition to the monitor 47, computer systems typically include other peripheral output devices (not shown), such as speakers and printers.

The computer system 20 may operate in a networked environment using wired or wireless connections to one or more remote computers 49. The remote computer (or computers) 49 may be represented by another computer system, a server, a router, a network PC, a peer device or other common network node, and typically includes many or all of the elements described above relative to the computer system 20, although only a memory storage device 50 has been illustrated. The connections may include, but are not limited to, a local area network (LAN) 51 and a wide area network (WAN) 52. Such networking environments are common in offices, enterprise-wide computer networks, Intranets and the Internet.

When used in a LAN networking environment, the computer system 20 is connected to the local network 51 through a network interface or adapter 53. When in a WAN networking environment, the computer system 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the computer system 20, or portions thereof, may be stored in the remote memory storage device. It will be appreciated that the network connections shown are exemplary and other means of establishing a communications link between the computers may be used.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system and/or across a network such as the Internet with other systems by way of the signal.

In one or more aspects, the functions described herein may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray® disc where disks usually reproduce data magnetically, while discs usually reproduce data optically with lasers. Combinations of the above should also be included within the scope of computer-readable media.

In the interest of clarity, not all of the routine features of the implementations described herein are shown and described. It will be appreciated that in the development of any such actual implementation, numerous implementation-specific decisions must be made in order to achieve the developer's specific goals, such as compliance with application-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of limitation, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such. The various embodiments disclosed herein encompass present and future known equivalents to the known components referred to herein by way of illustration. Moreover, while embodiments and applications have been shown and described, it would be apparent to those skilled in the art having the benefit of this disclosure that many more modifications than mentioned above are possible without departing from the inventive concepts disclosed herein.

What is claimed is:

1. A computer-implemented method for malware classification, the method comprising:

emulating, by a hardware processor, software code and recording actions of the emulated software code in an activity log;

generating from the activity log an execution flow graph of the emulated software code for presentation to a human malware expert, wherein the execution flow graph visually illustrates a flow of actions performed by the emulated software code;

parsing the execution flow graph of the emulated software code to identify one or more malicious behavior patterns therein;

classifying the emulated software code into one or more classes of malware; and generating a graphical diagram of the malware classifications for presentation to the human malware expert, wherein the diagram visualizes the relationships between the classified software code and known malicious programs associated with the same or related classes of malware.

2. The method of claim 1 further comprising generating a customized malware report based on the execution flow graph and diagram of the malware classifications for presentation to the human malware expert.

3. The method of claim 1, wherein classifying the emulated software code into one or more classes of malware further comprising computing similarity indexes between the identified malicious behavior patterns and one or more malicious behavior patterns associated with known classes of malware.

4. The method of claim 1, wherein analyzing the software code includes performing malware signature matching on the software code.

5. The method of claim 1, wherein analyzing the activity log includes computing security rating for the emulated software code.

6. The method of claim 1, wherein emulating the software code includes emulating the software code using one or more of a script emulator, an encrypted script emulator and a sandbox.

7. The method of claim 1, further comprising visually designating one or more identified malicious behavior patterns in the execution flow graph for presentation to the human malware expert.

8. The method of claim 1, wherein the execution flow graph includes a plurality of blocks identifying actions of the emulated software code, wherein differently shaped blocks represent different actions of the emulated software code and differently colored blocks represent different malicious actions of the emulated software code.

9. The method of claim 1, wherein parsing the execution flow graph includes performing a heuristic analysis of the actions of the emulated software code identified in the execution flow graph to identify one or more malicious behavior patterns therein.

10. The method of claim 3, wherein the similarity index being computed as a function of a number of API calls and associated parameters of the malicious behavior patterns identified in the emulated software code that are similar to API calls and associated parameters of malicious behavior patterns associated with known classes of malware.

11. The method of claim 2, wherein a malware report includes one or more of the following items of information about the emulated software code;
  malware classification information;
  information about created or modified files;
  information about accessed URL addresses;
  information about accessed, modified or deleted registry keys;
  information about opened windows;
  information about executed processes;
  security rating information; and
  malicious signature matching information.

12. A system for form malware classification, the system comprising:
  a system memory for storing a computer-executable software code; and
  a processor coupled to the memory and configured to:
    emulate the software code and recording actions of the emulated software code in an activity log;
    generate from the activity log an execution flow graph of the emulated software code for presentation to a human malware expert, wherein the execution flow graph visually illustrates a flow of actions performed by the emulated software code;
    parse the execution flow graph of the emulated software code to identify one or more malicious behavior patterns therein;
    classify the emulated software code into one or more classes of malware; and
    generate a graphical diagram of the malware classifications for presentation to the human malware expert, wherein the diagram visualizes the relationships between the classified software code and known malicious programs associated with the same or related classes of malware.

13. The system of claim 12, wherein the processor being further configured to generate a customized malware report based on the execution flow graph and diagram of the malware classifications for presentation to the human malware expert.

14. The system of claim 13, wherein to classify the emulated software code into one or more classes of malware, the processor being further configured to compute similarity indexes between the identified malicious behavior patterns and one or more malicious behavior patterns associated with known classes of malware.

15. The system of claim 12, wherein the processor being further configured to perform malware signature matching on the software code.

16. The system of claim 12, wherein the processor being further configured to compute security rating for the emulated software code.

17. The system of claim 12, wherein to emulate the software code, the processor being further configured to emulate the software code in one or more of a script emulator, an encrypted script emulator and a customized sandbox.

18. The system of claim 12, wherein the processor being further configured to visually designate one or more identified malicious behavior patterns in the execution flow graph for presentation to the human malware expert.

19. The system of claim 12, wherein the execution flow graph includes a plurality of blocks identifying actions of the emulated software code, wherein differently shaped blocks represent different actions of the emulated software code and differently colored blocks represent different malicious actions of the emulated software code.

20. The system of claim 19, wherein the processor being further configured to parse the execution flow graph by performing a heuristic analysis of the actions of the emulated software code identified in the execution flow graph to identify one or more malicious behavior patterns therein.

21. The system of claim 14, wherein the similarity index being computed as a function of a number of API calls and associated parameters of the malicious behavior patterns identified in the emulated software code that are similar to API calls and associated parameters of malicious behavior patterns associated with known classes of malware.

22. The system of claim 13, wherein a malware report includes one or more of the following items of information about the emulated software code:
  malware classification information;
  information about created or modified files;
  information about accessed URL addresses;
  information about accessed, modified or deleted registry keys;
  information about opened windows;
  information about executed processes;
  security ratings information; and
  malware signature matching information.

23. A computer program product embedded in a non-transitory computer-readable storage medium, the product includes computer-executable instructions for malware classification, including computer executable instructions for:
  emulating software code and recording actions of the emulated software code in an activity log;
  generating from the activity log an execution flow graph of the emulated software code for presentation to a human malware expert, wherein the execution flow graph visually illustrates a flow of actions performed by the emulated software code;
  parsing the execution flow graph of the emulated software code to identify one or more malicious behavior patterns therein;
  classifying the emulated software code into one or more classes of malware; and
  generating a graphical diagram of the malware classifications for presentation to the human malware expert, wherein the diagram visualizes the relationships between the classified software code and known malicious programs associated with the same or related classes of malware.

24. The computer program product of claim 23 further comprising instructions for generating a customized malware report based on the execution flow graph and diagram of the malware classifications for presentation to the human malware expert.

25. The computer program product of claim 23, wherein instructions for classifying the emulated software code into one or more classes of malware further comprising instruction for computing similarity indexes between the identified malicious behavior patterns and one or more malicious behavior patterns associated with known classes of malware.

26. The computer program product of claim 23, wherein instructions for analyzing the software code include instructions for performing malware signature matching on the software code.

27. The computer program product of claim 23, wherein instructions for analyzing the activity log include instructions for computing security rating for the emulated software code.

28. The computer program product of claim 27, wherein instructions for emulating the software code include instructions for emulating the software code using one or more of a script emulator, an encrypted script emulator and a customized sandbox.

29. The computer program product of claim 23, further comprising instructions for visually designating one or more identified malicious behavior patterns in the execution flow graph for presentation to the human malware expert.

30. The computer program product of claim 23, wherein the execution flow graph includes a plurality of blocks identifying actions of the emulated software code, wherein differently shaped blocks represent different actions of the emulated software code and differently colored blocks represent different malicious actions of the emulated software code.

31. The computer program product of claim 23, wherein instructions for parsing the execution flow graph include instructions for performing a heuristic analysis of the actions of the emulated software code identified in the execution flow graph to identify one or more malicious behavior patterns therein.

32. The computer program product of claim 23, wherein the similarity index being computed as a function of a number of API calls and associated parameters of the malicious behavior patterns identified in the emulated software code that are similar to API calls and associated parameters of malicious behavior patterns associated with known classes of malware.

33. The computer program product of claim 23, wherein a malware report includes one or more of the following items of information about the emulated software code;
    malware classification information;
    information about created or modified files;
    information about accessed URL addresses;
    information about accessed, modified or deleted registry keys;
    information about opened windows;
    information about executed processes;
    security ratings information; and
    signature matching information.

* * * * *